United States Patent [19]
Komaki

[11] Patent Number: 5,601,489
[45] Date of Patent: *Feb. 11, 1997

[54] COMPACT ELECTRONIC APPARATUS WITH REMOVABLE PROCESSING UNITS

[75] Inventor: Shigeki Komaki, Nara, Japan

[73] Assignee: Sharp Kabushiki Kaisha, Osaka, Japan

[ * ] Notice: The portion of the term of this patent subsequent to Jan. 2, 2007, has been disclaimed.

[21] Appl. No.: 296,176

[22] Filed: Aug. 29, 1994

Related U.S. Application Data

[63] Continuation of Ser. No. 602,929, Oct. 25, 1990, abandoned, which is a continuation of Ser. No. 413,712, Sep. 28, 1989, abandoned, which is a continuation of Ser. No. 186,718, Apr. 28, 1988, Pat. No. 4,890,832, which is a continuation of Ser. No. 898,819, Aug. 18, 1986, abandoned, which is a continuation of Ser. No. 539,190, Oct. 5, 1983, abandoned.

[30] Foreign Application Priority Data

Oct. 13, 1982 [JP] Japan ................................. 57-179452

[51] Int. Cl.⁶ ..................................................... A63F 9/24
[52] U.S. Cl. ................................. 463/44; 463/46; 463/48; 235/146; 341/23; 364/709.1
[58] Field of Search ..................................... 273/433, 434, 273/435, 148 B, 85 G; 364/410, 705, 706, 708, 709, 709.1, 712; 235/61 R, 61 PB, 357, 376, 146; 206/328, 444, 387, 305, 320; 463/44, 46, 48; 341/23

[56] References Cited

U.S. PATENT DOCUMENTS

| | | | |
|---|---|---|---|
| 3,896,290 | 7/1975 | Denaual | 235/61 R |
| 4,006,764 | 2/1977 | Yamamoto et al. | 206/305 |
| 4,071,065 | 1/1978 | Halbich | 206/320 |
| 4,075,702 | 2/1978 | Davies | 206/305 |
| 4,092,527 | 5/1978 | Luecke | 364/709 |
| 4,119,839 | 10/1978 | Beckmann et al. | 235/146 |
| 4,158,230 | 6/1979 | Washizuka et al. | 206/305 |
| 4,220,992 | 9/1980 | Blood et al. | 273/183 R |
| 4,293,070 | 10/1981 | Ohlbach | 206/444 |
| 4,618,927 | 10/1986 | Hatta | 364/705.01 |
| 4,756,414 | 7/1988 | Mott | 306/328 |
| 4,890,832 | 1/1990 | Komaki | 273/435 |

FOREIGN PATENT DOCUMENTS

| | | |
|---|---|---|
| 57-60243 | 4/1982 | Japan . |
| 57-22101 | 6/1982 | Japan . |

*Primary Examiner*—Jessica Harrison
*Assistant Examiner*—Michael O'Neill

[57] ABSTRACT

A compact electronic apparatus comprises a main unit having at least a power supplying section and a display, at least one of several processing units having a key input section and a memory adapted to be removably attached to the main unit and a connecting section for connecting one of said processing units to the main unit. Each of the processing units has a different function.

18 Claims, 2 Drawing Sheets

COMPACT ELECTRONIC APPARATUS WITH REMOVABLE PROCESSING UNITS

This application is a continuation of application Ser. No. 07/602,929, filed on Oct. 25, 1990, now abandoned; which is a rule 62 continuation of Ser. No. 07/413,712 filed Sep. 28, 1989, now abandoned; which is a rule 60 continuation of Ser. No. 07/186,718 filed Apr. 22, 1988, U.S. Pat. No. 4,890,832; which is a rule 62 continuation of Ser. No. 06/898,819 filed Aug. 18, 1986, now abandoned; which is a rule 62 continuation of Ser. No. 06/539,190 filed Oct. 5, 1983, now abandoned.

BACKGROUND OF THE INVENTION

The present invention relates to a compact electronic apparatus, more particularly, to a compact electronic apparatus with removable processing units.

Recently, for example, a single-purpose electronic apparatus such as a functional calculator and the like and a composite electronic apparatus such as a cash conversion calculator, a game calculator and a timepiece calculator and the like have been developed. The several different kinds of electronic calculators are frequently owned by a single individual.

However, it is difficult to carry around several different kinds of the electronic apparatus, simultaneously, since the volume of the electronic apparatus is increased. Accordingly, and inevitably, only the one apparatus which is most frequently used is actually carried around, which means that the other devices are rarely used. Also, it is expensive for the user to buy various different kinds of the electronic apparatus.

If the composite electronic calculator having the function of a game or a timepiece is operated, several keys for calculating are also used as keys for the game or the timepiece, which renders the operation rather complex. Accordingly, key inputs tend to be entered in error, and thus the operation of the apparatus can not be executed reliably.

SUMMARY OF THE INVENTION

An object of the present invention is to provide a compact electronic apparatus which is capable of changing functions, thereby eliminating the above problems.

Another object of the present invention is to provide a compact electronic apparatus combined with several removable processing units for changing the functions of the apparatus, including a key input means and a memory means.

Still another object of the present invention is to provide a compact electronic apparatus comprising a main unit and several removable processing units.

A further object of the present invention is to provide a compact electronic apparatus which is stored in a case for carrying several removable processing units.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, a compact electronic apparatus comprises a main unit having at least a power supplying section and a display, at least one of several processing units having keys and at least one memory unit, and a connection section on the main unit for selectively connecting one of the several processing units to the main unit. Each of the several processing units has a different function. Further, the main unit containing one of the several processing units, and the remaining processing units are stored in a notebook-type case.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE INVENTION

Figure 1:
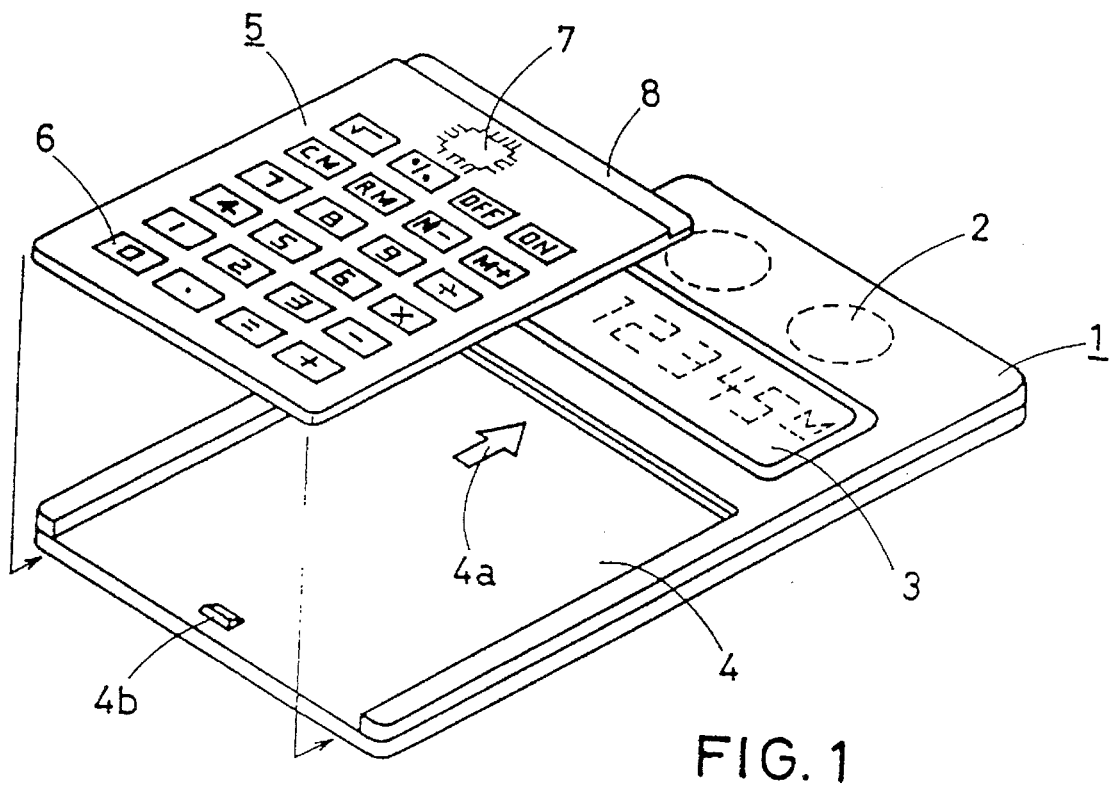
FIG. 1 is a perspective side view of an embodiment of a compact electronic apparatus of the present invention.

In FIGS. 1–4, like reference numerals are utilized to designate the corresponding elements throughout said figures. Referring to FIG. 1, a main unit 1 comprises at least a power supplying section 2 having several electric batteries or cells, the display 3 such as a liquid crystal display cell for displaying dots, and a holder section 4 for detachably holding a processing unit 5.

The removable processing unit 5 comprises a key input section 6, a memory 7 and connecting terminals 8 for supplying signals to the display 3 of the main unit 1. When the processing unit 5 is connected to the main unit 1, the processing unit 5 is inserted in the direction of an arrow 4a, and the processing unit 5 is held by a projection 4b in the holder section 4 of the main unit 1.

The memory 7 comprises an integrated circuit element (or LSI) including at least a memory section.

The removable processing unit 5 and the main unit 1 are separately provided and the removable processing unit 5 can be detachably stored in the holder section 4 of the main unit 1. Each of a plurality of the removable processing units provides a different function of the composite of the main unit for example, the main unit can be caused to function as a calculator, a game, a timepiece or the like. To include the key input section and the memory section into each of the several removable processing units enhances the universality and the performance of the electronic apparatus.

When the processing unit 5 is in the form of a card, it can be called a "micon card". If the main unit and the several micon cards are simultaneously carried by the user, one electronic apparatus can operate a great number of functions, such as for example, a functional apparatus, a game apparatus, a timepiece apparatus and a calculator apparatus. The removable processing unit 5 of FIG. 1 functions as a calculator.

Figure 2:
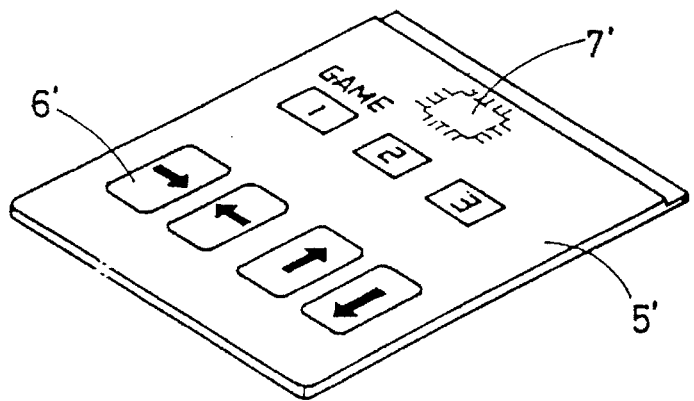
FIG. 2 is a perspective side view of one of several removable processing units of the present invention.

The memory (LSI) 7 in the removable processing unit 5 may include a CPU (Central Processing Unit) and a ROM (Read Only Memory). Otherwise, the memory (LSI) 7 in the removable processing unit 5 may include only the ROM, and the main unit 1 may include the CPU, so that the main unit 1 and the removable processing unit 5 can use the CPU in the main unit 1. The ROM of the processing unit 5 memorizes a program for controlling the CPU in the predetermined arithmetic order. In place of the removable processing unit 5 as shown in FIG. 1 having a calculator function, a removable processing unit 5' as shown in FIG. 2 having a game function can be stored into the main unit 1. In this case, the removable processing unit 5' includes an LSI 7' having a game function. Game key symbols, characters and numbers are printed on the removable processing unit 5'.

Figure 3:
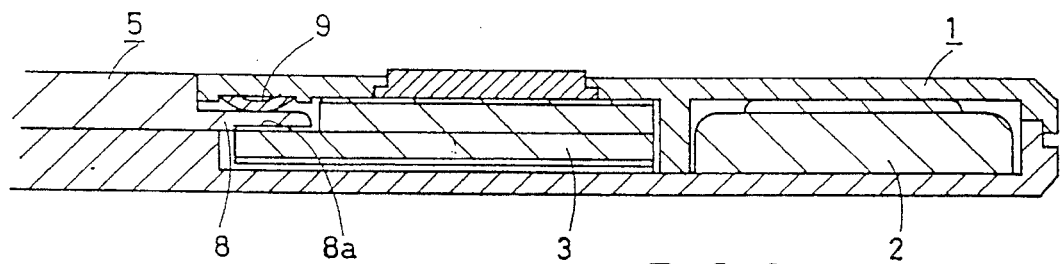
FIG. 3 is a sectional view of a compact electronic apparatus as shown in FIG. 1 when one of several removable processing units is connected to a main unit.

FIG. 3 is a sectional view of a compact electronic apparatus when one of several removable processing units is connected to a main unit. Each of electrodes 8a of the connecting terminals 8 of the processing unit 5 is connected to each of electrodes of the liquid crystal display cell 3 by a terminal pressure plate 9. The terminal pressure plate 9 fixes the connection of the electrodes by pressure.

Figure 4:
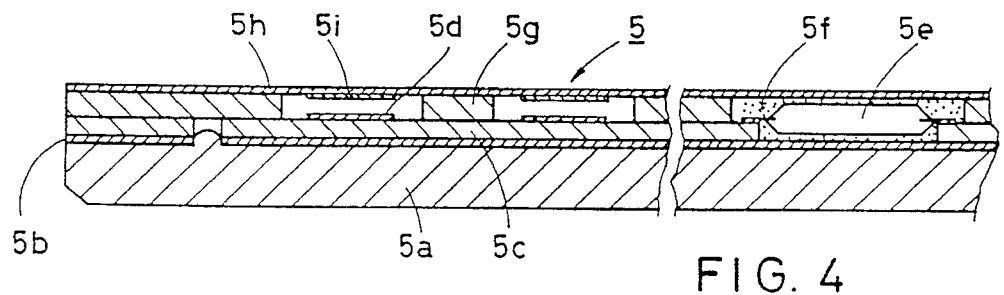
FIG. 4 is a sectional view of the removable processing unit as shown in FIG. 1.

FIG. 4 is a sectional view of a removable processing unit of FIG. 1. An ornamental film 5b is adhered on a base substrate 5a. The ornamental film 5b is made of a polyester or the like. A key input and circuit substrate 5c having contacts 5d and an LSI chip 5e is provided on the ornamental film 5b. The LSI chip 5e is strengthened by filling the surrounding area with a resin material 5f such as an epoxy resin or the like. An opening is provided to the substrate 5c for flatly packaging the LSI chip 5e as a flat package type LSI. In addition, the LSI chip 5e may be a film carrier type LSI and may be bonded directly on the substrate for packaging more flatly. The present invention can use various packages of the LSI chips.

An ornamental film 5h having input contacts 5i, each opposing the contacts 5d of the substrate 5c is provided above the substrate 5c. Spacers 5g are inserted between the substrate 5c and the ornamental film 5h. The ornamental film 5h is made of a polyester or the like, and key symbols, characters, and numerals as shown in FIGS. 1 and 2 are printed on the ornamental film 5h.

Figure 5:
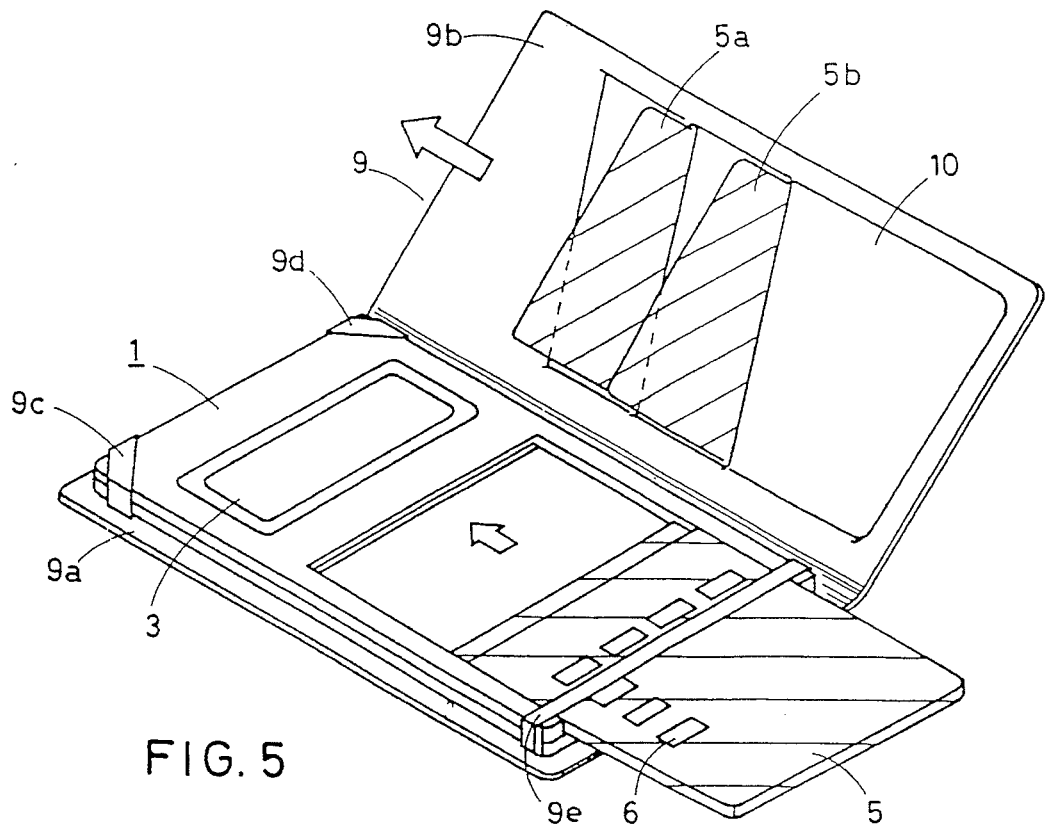
FIG. 5 is a perspective side view of another embodiment of a compact electronic apparatus of the present invention.

FIG. 5 is a perspective view of another embodiment of a compact electronic apparatus stored in a case of the present invention.

Conventional card-type electronic calculators have been stored in a case for carrying. The conventional cases are made of a non-conductive sheet such as a vinyl chloride, a nylon or the like. The non-conductive sheet is made in the form of a notebook which is bonded by supersonic waves, high frequency waves or the like.

The compact electronic apparatus of the present invention is separated into the main unit 1 and the removable processing unit, and the terminals for supplying signals to the display of the main unit 1 are provided on the removable processing unit. If the compact electronic apparatus of the present invention comprising the main unit 1 and the removable processing unit is stored in a conventional case made of the non-conductive sheet such as vinyl chloride, the nylon or the like, static electricity is generated. The LSI as an arithmetic element in the removable processing unit is destroyed by static electricity. When the LSI includes a memory, the information in the memory may be erased.

Accordingly, the case of the present invention is provided with measures for countering the static electricity. The notebook type case 9 comprises a front cover 9a and a rear cover 9b connected to the front cover 9a. Holders 9c–9e for storing the main unit 1 to be connected to one of the several processing units are provided on the inside surface of the front cover 9a. Holders 10 for storing the remaining several processing units 5a and 5b are also provided on the inside surface of the rear cover 9b. At least the holders 10 are made of a conductive sheet, for example, a vinyl chloride material containing carbon. The conductive sheet can be made in the form of a notebook by a bonding process utilizing supersonic waves or high frequency waves or the like.

As described above, when the holders 10 are made of the conductive sheet, the LSI element is not destroyed by static electricity, and the information in the new memory is not erased. Further, dust produced by static electricity will not adhere to the terminals of the processing unit. The connection between the terminals of the processing unit and the terminals of the main unit is maintained in a good state.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic apparatus having a first function and performing a second function different from said first function according to instructions and data inputted through a keyboard, comprising:

a main body having a power source;

a receiving portion formed in said main body; and a plurality of integrated circuit card means, each for enabling the electronic apparatus to perform an operation of a distinct category of the electronic apparatus, said integrated circuit card means being shaped to fit securely in said receiving portion;

each said integrated circuit card means including,
means for changing the physical configuration of at least a portion of the keyboard, and
a memory integrated circuit chip.

2. The electronic apparatus as claimed in claim 1, further comprising keypad means associated with said portion of said keyboard, said portion of the keyboard of said integrated circuit card means comprises indicating means for designating a function associated with said keypad means.

3. The electronic apparatus as claimed in claim 1, further comprising:

a portable casing for housing said main body and said integrated circuit cards.

4. The electronic apparatus as claimed in claim 3, wherein said portable casing comprises a holder made of a conductive sheet for storing said integrated circuit card means.

5. The electronic apparatus as claimed in claim 1, wherein said main body includes display means for displaying information related to the functioning of said main unit and each integrated circuit card is connected to said main body through said receiving portion such that said receiving portion is located on said main body opposite a portion of said main body having said display means.

6. The electronic apparatus as claimed in claim 5, wherein said display means is a liquid crystal display.

7. An electronic organizer having a first function and performing a second function different from said first function according to instructions and data inputted through a keyboard, comprising:

a main body having a power source and liquid crystal display;

a receiving portion formed in said main body;

a portable casing for housing said main body; and a plurality of integrated circuit cards, each integrated circuit card enabling said main body to perform an operation of a distinct category of the electronic apparatus, said integrated circuit cards being shaped to fit securely in said receiving portion;

each said integrated circuit card including,
  means for changing the physical configuration of at least a portion of the keyboard, and
  a memory integrated circuit chip;

said portable casing including,
  a plurality of pocket portions for storing said integrated circuit cards not being used by said main body.

8. The electronic organizer as claimed in claim 7, wherein said portable casing comprises a holder made of a conductive sheet for storing said integrated circuit card means.

9. The electronic organizer as claimed in claim 8, wherein said main unit includes arithmetic means for providing calculator operations in said main unit and said memory means including program memory means for storing programs to be used by said control means.

10. The electronic organizer as claimed in claim 8, wherein said integrated circuit card includes connecting terminal means for supplying signals from said integrated circuit card to said control means.

11. The electronic organizer as claimed in claim 8, wherein said memory means includes game memory means for storing a game program.

12. The electronic organizer as claimed in claim 8, further comprising case means for storing the electronic apparatus.

13. The electronic organizer as claimed in claim 11, wherein said case means comprises:

first cover means for storing said main unit and said integrated circuit card wherein said integrated circuit card is connected to said main unit; and second cover means, connected to said first cover means, for covering said main unit being stored.

14. The electronic organizer as claimed in claim 12, wherein said second cover means includes storing means for storing a plurality of integrated circuit cards not connected to said main unit.

15. The electronic organizer as claimed in claim 13, wherein said storing means comprises a material which prevents static electricity generation.

16. The electronic organizer as claimed in claim 14, wherein said material is a conductive material.

17. The electronic organizer as claimed in claim 15, wherein said conductive material is a vinyl chloride containing carbon.

18. An electronic organizer having a keyboard for inputting information comprising:

a main unit;

a removable detachable integrated circuit card means for performing a predetermined operation of a distinct category in confirmation with said main unit; and connecting means for connecting said integrated circuit card to said main unit to provide an electrical connection therebetween;

said main unit including,
  control means for controlling operations of said main unit;
  power supply means for supplying power to said control means and for supplying power to said integrated circuit card means when said integrated unit is connected to said main unit, and
  display means, operatively connected to said control means, for displaying information on said main unit;

said integrated circuit card means including,
  means for physically reconfiguring the keyboard for designating preselected information or functions to be inputted into said control means and for changing a physical configuration of a keyboard input device, and
  memory means for storing data to be used by said control means;

said connecting means including a receiving portion for supporting said integrated circuit card means.

* * * * *